(12) United States Patent
Axemo et al.

(10) Patent No.: US 8,094,887 B2
(45) Date of Patent: Jan. 10, 2012

(54) METHOD AND SYSTEM FOR ANALYZING IMAGE IDENTIFICATIONS TO IDENTIFY AN ENTITY

(75) Inventors: Sven Georg Axemo, Lidingo (SE); Carl Viktor August Johnsson Hamilton, Stockholm (SE); Mohammad Ali Sanamrad, Lidingo (SE); Alexis William Gustaf Tesdorf, Enskededalen (SE)

(73) Assignee: International Business Machines Corporation, Armonk, NY (US)

( * ) Notice: Subject to any disclaimer, the term of this patent is extended or adjusted under 35 U.S.C. 154(b) by 1067 days.

(21) Appl. No.: 11/693,944

(22) Filed: Mar. 30, 2007

(65) Prior Publication Data

US 2008/0031522 A1    Feb. 7, 2008

(30) Foreign Application Priority Data

Jun. 8, 2006 (GB) .................................. 0611561.2

(51) Int. Cl.
  *G06K 9/62* (2006.01)
(52) U.S. Cl. .................. 382/105; 382/187; 382/200
(58) Field of Classification Search .................. 382/105
  See application file for complete search history.

(56) References Cited

U.S. PATENT DOCUMENTS

| | | | |
|---|---|---|---|
| 3,969,698 A | | 7/1976 | Bollinger et al. |
| 4,817,166 A | * | 3/1989 | Gonzalez et al. ............. 382/105 |
| 5,455,872 A | | 10/1995 | Bradley |
| 5,970,171 A | | 10/1999 | Baraghimian et al. |
| 6,109,525 A | | 8/2000 | Blomqvist et al. |
| 6,219,453 B1 | | 4/2001 | Goldberg |
| 6,400,805 B1 | | 6/2002 | Brown et al. |
| 6,959,869 B2 | | 11/2005 | Tsikos et al. |
| 7,092,561 B2 | | 8/2006 | Downs, Jr. |
| 7,539,326 B2 | | 5/2009 | Eremita et al. |
| 7,738,706 B2 | | 6/2010 | Aradhye et al. |
| 2006/0030985 A1 | | 2/2006 | Lawida et al. |
| 2006/0064345 A1 | | 3/2006 | Biet |

(Continued)

FOREIGN PATENT DOCUMENTS

DE    10104502    8/2002

(Continued)

OTHER PUBLICATIONS

English Abstract of JP 05189598, Jul. 30, 1993, Mori et al., 2 pages.*

(Continued)

*Primary Examiner* — Brian Werner
(74) *Attorney, Agent, or Firm* — Schmeiser, Olsen & Watts; John Pivnichny

(57) ABSTRACT

A method for analyzing image identifications to determine whether image identifications identify an entity (e.g., license plate of a vehicle). Identification sets are received from at least one optical character recognition (OCR) engine. Each identification set includes a character string and an associated confidence level. Each character string is derived by the respective OCR engine from an image of the entity. An identification set is received from each OCR engine. The character strings are compared, resulting in identifying all conflicting character strings, wherein any two non-identical character strings are considered to be conflicting. The confidence level in each identification set is analyzed, resulting in determining whether each confidence level exceeds a predefined threshold confidence level. At least one rule is applied to the preceding results to ascertain whether or not the entity has been identified. An indication of whether or not the entity has been identified is stored.

35 Claims, 8 Drawing Sheets

U.S. PATENT DOCUMENTS

2008/0118110 A1    5/2008    Simonsson

FOREIGN PATENT DOCUMENTS

| EP | 0516316 | A2 | 12/1992 |
| EP | 0585916 | A1 | 3/1994 |
| EP | 0618544 | A1 | 10/1994 |
| JP | 05189598 | * | 7/1993 |
| WO | WO9841953 | | 9/1998 |

OTHER PUBLICATIONS

U.S. Appl. No. 11/872,196, filed Oct. 15, 2007; Confirmation No. 8403.

Office Action (Mail Date Feb. 4, 2011) for U.S. Appl. No. 11/872,196, filed Oct. 15, 2007; Confirmation No. 8403.

Apr. 21, 2011 filed Response to Office Action (Mail Date Feb. 4, 2011) for U.S. Appl. No. 11/872,196, filed Oct. 15, 2007 Confirmation No. 8403.

Notice of Allowance (Mail Date Apr. 28, 2011) for U.S. Appl. No. 11/872,196, filed Oct. 15, 2007; Confirmation No. 8403.

May 6, 2011 filed Request for Continued Examination (RCE) with Information Disclosure Statement (IDS) for U.S. Appl. No. 11/872,196, filed Oct. 15, 2007; Confirmation No. 8403.

Notice of Allowance (Mail Date May 26, 2011) for U.S. Appl. No. 11/872,196; Filing Date Oct. 15, 2007; Confirmation No. 8403.

* cited by examiner

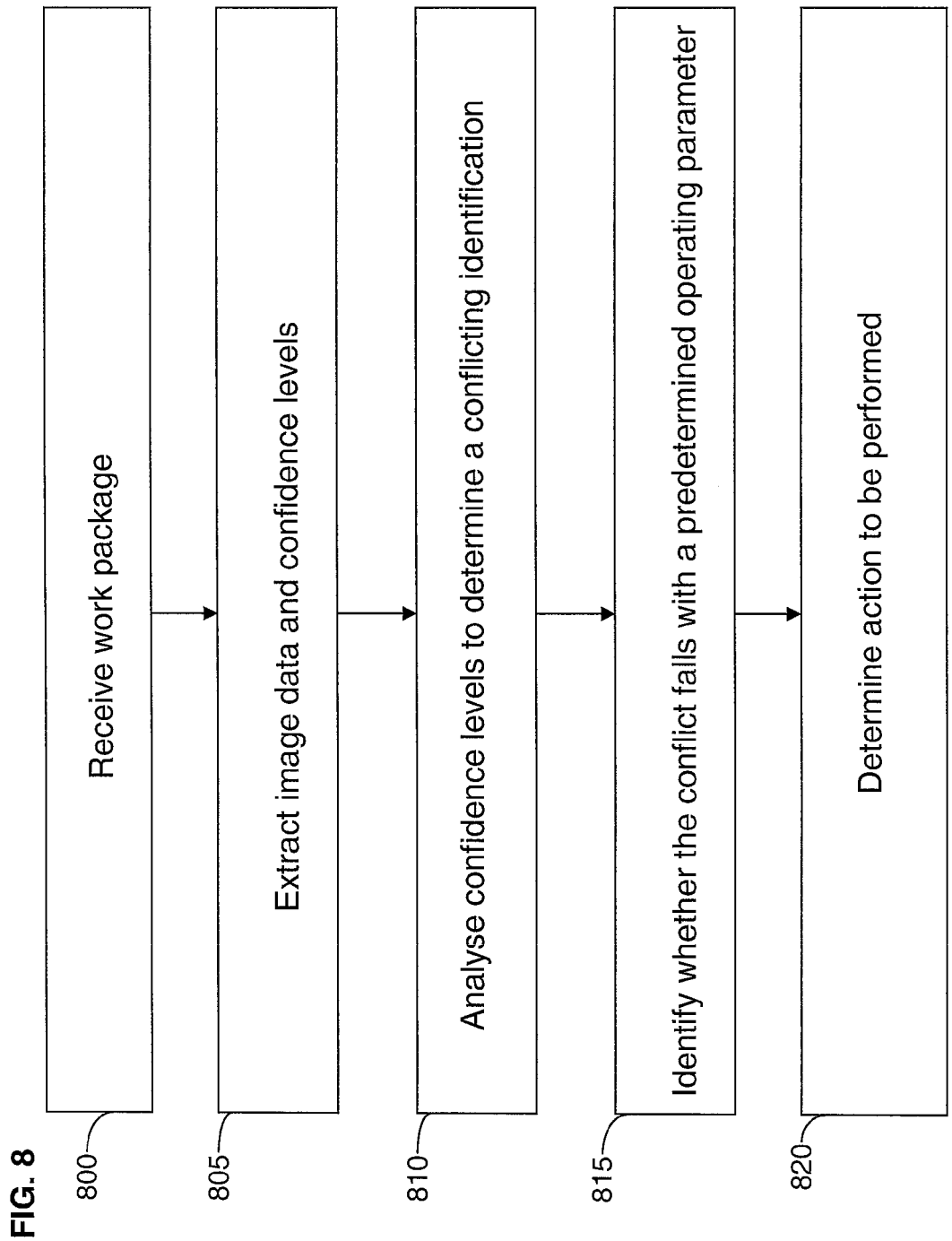

METHOD AND SYSTEM FOR ANALYZING IMAGE IDENTIFICATIONS TO IDENTIFY AN ENTITY

FIELD OF THE INVENTION

The invention relates to the field of optical character recognition systems and in particular, the invention relates to a validation engine for verifying identical and conflicting image identifications generated by optical character recognition systems to identify an entity such as a license plate of a vehicle.

BACKGROUND OF THE INVENTION

More and more systems, whether these are security systems or road charging systems, rely on the taking of photographs in order to identify people or vehicles. In order to identify people or vehicles, information is extracted from the photograph, such as a vehicle registration number or an employee number. Often the photograph is taken while people or vehicles are on the move and in all kinds of weather conditions.

When relying on these photographs for identification or data extraction purposes, the quality of the photographs plays a vital part. Often the weather obscures the photographs. For example, one day the weather may be sunny and bright and although this would seem like good weather conditions for taking a photograph, the sun may reflect on the vehicle's paint work and cause a certain amount of glare, thus causing distortion of the photograph. On another day the weather may be snowing and thus a clear image cannot be taken because the snow may be adhering to the vehicle, thus obscuring the vehicle registration number. Other variables may comprise the quality of daylight or whether the charging point's light source is capable of providing an adequate light source in which to illuminate the license plate at night, or how fast the vehicle is traveling through a charging point area, or even the vehicle's height and size, etc.

In order to make any meaningful sense of data contained within a photograph, optical character recognition (OCR) engines are deployed to translate characters within the image into a standard encoding scheme. Due to the fact that some photographs (for example, a photograph of a vehicle license plate) may be obscured because of snow resting on the license plate, the OCR engine may not be able to confidently translate the image characters into the appropriate encoding scheme. It has been shown in the art that the OCR translation results are far from accurate. This poses a problem in vehicle charging environments where actions such as billing the vehicle owner are carried out on the basis of the OCR results which are often not accurate.

Thus there is a need in the art for a means to verify and improve on the OCR translation results.

SUMMARY OF THE INVENTION

The present invention provides a method for analyzing image identifications to determine whether the image identifications identify an entity, said method comprising:

receiving, by a validation engine from at least two optical character recognition (OCR) engines, at least two identification sets such that each identification set comprises a character string consisting of a plurality of characters and a confidence level associated with the character string, wherein each character string has been derived by respective OCR engine of the at least two OCR engines from an image of the entity, wherein at least one identification set of the at least two identification sets is received by the validation engine from each OCR engine;

comparing, by the validation engine, each character string with every other character string, resulting in identifying all conflicting character strings, wherein any two non-identical character strings are considered to be conflicting;

analyzing, by the validation engine, the confidence level in each identification set, resulting in determining whether said each confidence level exceeds a predefined threshold confidence level;

applying, by the validation engine, a rule to the identifying resulting from said comparing and/or to the determining resulting from said analyzing, resulting in ascertaining whether or not the entity has been identified; and storing, in a data store coupled to the validation engine, an indication of whether or not said ascertaining has ascertained that the entity has been identified, wherein said storing is performed by the validation engine.

The present invention provides a method for analyzing image identifications to determine whether the image identifications identify a license plate of a vehicle, said method comprising:

receiving, by a validation engine from at least one optical character recognition (OCR) engine, at least two identification sets such that each identification set comprises a character string consisting of a plurality of characters and a confidence level associated with the character string, wherein each character string has been derived by a respective OCR engine of the at least one OCR engine from an image of the license plate attached to the front or rear of the vehicle, wherein at least one identification set of the at least two identification sets is received by the validation engine from each OCR engine;

comparing, by the validation engine, each character string with every other character string, resulting in identifying all conflicting character strings, wherein any two non-identical character strings are considered to be conflicting;

analyzing, by the validation engine, the confidence level in each identification set, resulting in determining whether said each confidence level exceeds a predefined threshold confidence level and/or is within a predefined range of confidence levels;

applying, by the validation engine, at least one rule to the identifying resulting from said comparing and/or to the determining resulting from said analyzing, resulting in ascertaining whether or not the license plate has been identified; and storing, in a data store coupled to the validation engine, an indication of whether or not said ascertaining has ascertained that the license plate has been identified, wherein said storing is performed by the validation engine.

The present invention provides a method and system that improve on the current OCR translation results.

BRIEF DESCRIPTION OF THE DRAWINGS

FIG. 8 is a flow chart showing the operational steps, in accordance with embodiments of the present invention.

DETAILED DESCRIPTION OF THE INVENTION

Figure 1:
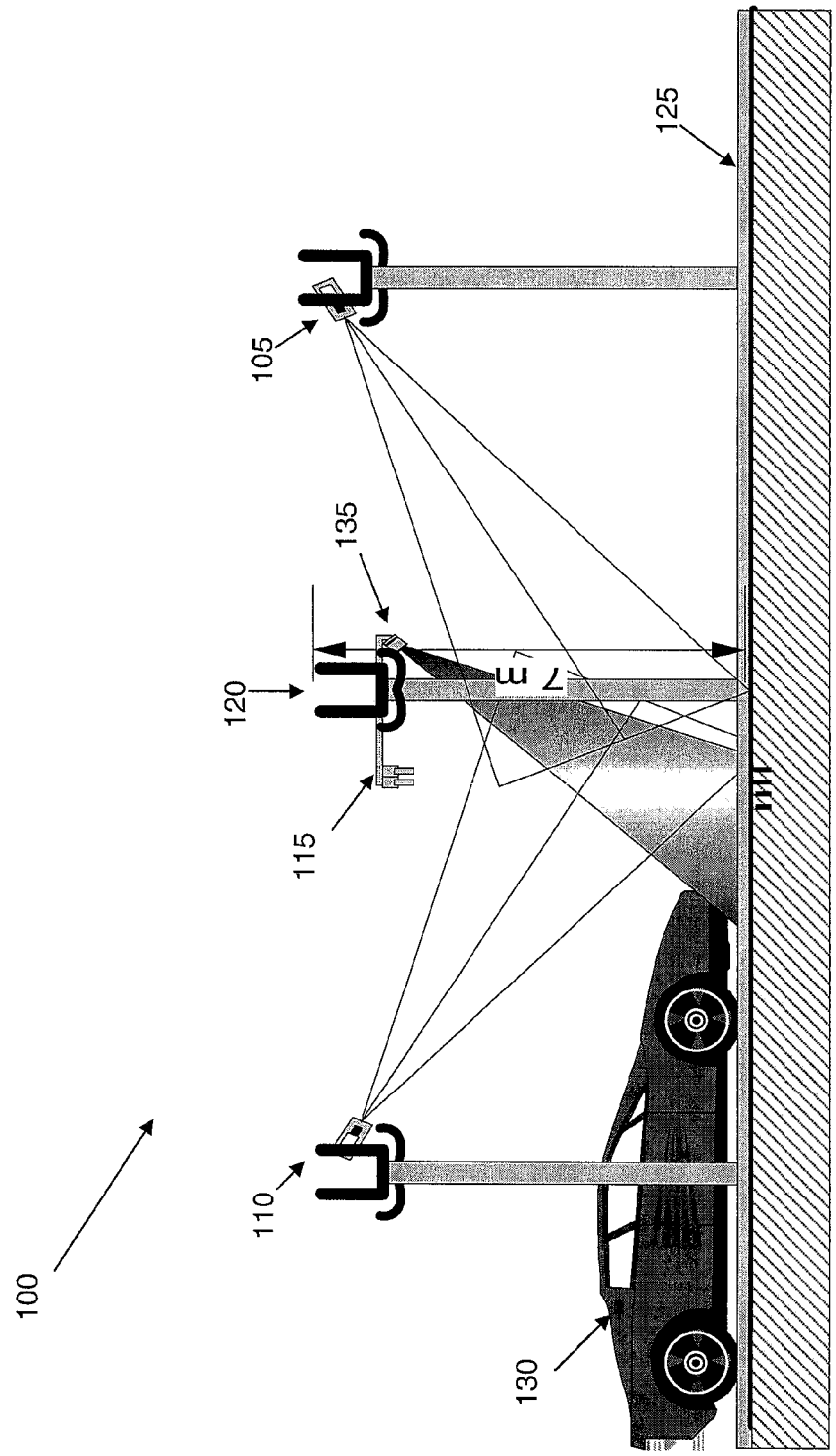
FIG. 1 is a block diagram detailing a vehicle driving through a charging point area in which an image is taken of the vehicle's front license plate, in accordance with embodiments of the present invention.

Viewed from a first aspect, the present invention provides a validation engine for determining an action to be performed in response to conflicting image identifications being generated by at least two optical character recognition systems, the validation engine comprising: an analysis component for receiving an image identification of an aspect of the same entity (e.g., a license plate of a vehicle) from each of the optical recognition systems, each image having a generated confidence value; the analysis component comparing the generated confidence values to determine an identification conflict between each of the received image identifications; and the analysis component analyzing the generated conflict to identify whether the identification conflict falls within a predetermined range of operating parameters and on dependence upon where in the range the identification conflict lies determining an action to be performed.

The validation engine provides for receiving image identifications from a number of optical character recognition (OCR) engines. Each image identification comprises a confidence level (i.e., how easy it was for the OCR engine to identify the characters in the image and within a predefined syntax). Although each OCR engine may be analyzing the same image as another OCR engine is analyzing, the identifications made by each of the OCR engines may be conflicting and thus non-identical. The validation engine uses a number of rules in order to validate and understand the conflicting identifications and to determine the action to be performed in response to the conflicting identifications. For example, a manual agent may be instructed to resolve the conflict by analyzing the captured images and the identifications of the OCR engines. Perhaps the conflict is negligible and the registered owner of a vehicle can be clearly identified and thus a notice is generated for transmission to a billing system.

The validation engine provides for a higher accuracy in determination of the registered owner of the vehicles by resolving conflict between identifications.

The present invention provides a validation engine wherein the action comprises transmitting each of the image identifications, the generated confidence levels, and the determined conflict to a manual agent for resolution of the conflict.

The present invention provides a validation engine further comprising an analysis component receiving captured images of each of the image identifications for transmitting to a manual agent for resolution of the conflict.

The present invention provides an apparatus wherein the action comprises requesting the analyzing component to determine whether the identification conflict can be resolved by applying a rule and if the conflict can be resolved by applying a rule generating a notification to a billing system.

The present invention provides a validation engine wherein the analysis component determines that there are no conflicting image identifications and the analysis component generates a notification to a billing system.

The present invention provides a validation engine wherein an aspect of an image comprises an image of a vehicle's front or rear license plate.

The present invention provides a validation engine wherein an aspect of an image comprises an entity's identification marker.

The present invention provides a validation engine wherein the predetermined range of operating parameters comprises a range of percentage values indicative of the ease in which the OCR engine identified each character in the image.

The present invention provides an apparatus further comprising a receiving component for managing image identifications and confidence levels received from one or more OCR engines.

The present invention provides an apparatus wherein the receiving component further comprises storing the image identifications on a queue for a predetermined amount of time in order to wait for further image identifications relating to the same entity for processing.

The present invention provides an apparatus wherein the analysis component further receives translated image data from an OCR engine.

The present invention provides an apparatus wherein the analysis component analyses the translated image data and the generated confidence values to determine if the translated image data falls into an exception area such that no further action should be performed.

Viewed from a second aspect, the present invention provides a method for determining an action to be performed in response to conflicting image identifications being generated by at least two optical character recognition systems, the validation engine comprising: receiving an image identification of an aspect of the same entity from each of the optical recognition systems, each image having a generated confidence value; comparing the generated confidence values to determine an identification conflict between each of the received image identifications; and analyzing the generated conflict to identify whether the identification conflict falls within a predetermined range of operating parameters and on dependence of where in the range the identification conflict lies determining an action to be performed.

Viewed from a third aspect, the present invention provides a data processing system for determining an action to be performed in response to conflicting image identifications being generated by at least two optical character recognition systems, the data processing system comprising: a processor (e.g., a central processing unit), a computer readable memory device coupled to the processor, and a storage device, said memory device comprising computer-readable instructions configured to be executed on the processor to perform the invention described above.

Viewed from a fourth aspect, the present invention comprises a computer program product loadable into the internal memory of a digital computer, comprising software code portions for performing, when said product is run on a computer, the present invention.

FIG. 1 shows a vehicle 130 travelling along a road 125 through a charging point area 100, in accordance with embodiments of the present invention. A charging point area 100 typically, comprises at least one camera 105, 110 for talking an image of an aspect of a vehicle 130 (e.g., a first camera 110 taking an image of the vehicle's front license plate). The charging point area 100 may also comprise a second camera 105 for taking a photograph of the vehicle's rear license plate.

The charging point area 100 also comprises a laser detector 115 for detecting the presence of the vehicle 130 in the charging point area 100 and on detection of the vehicle 130 in the charging point area 100, triggering the first camera 105 to take an image. As the vehicle 130 drives through the charging point area 100, the laser 115 triggers a second camera 110 to take an image of, for example, the rear license plate. Each camera 105, 110 stores the images in memory and transmits the images to a central data store via a network communication means (not shown).

A light 135 is also provided which illuminates the road 125 in order to illuminate an aspect of the vehicle 130 as the vehicle drives through the charging point area 100. In the illustration of FIG. 1, the camera 105 is taking a photograph of the vehicle's front license plate. The photograph is stored in a data store (not shown) along with information such as the date, the time and an identifier identifying the location of the charging point area 100.

Figure 2:
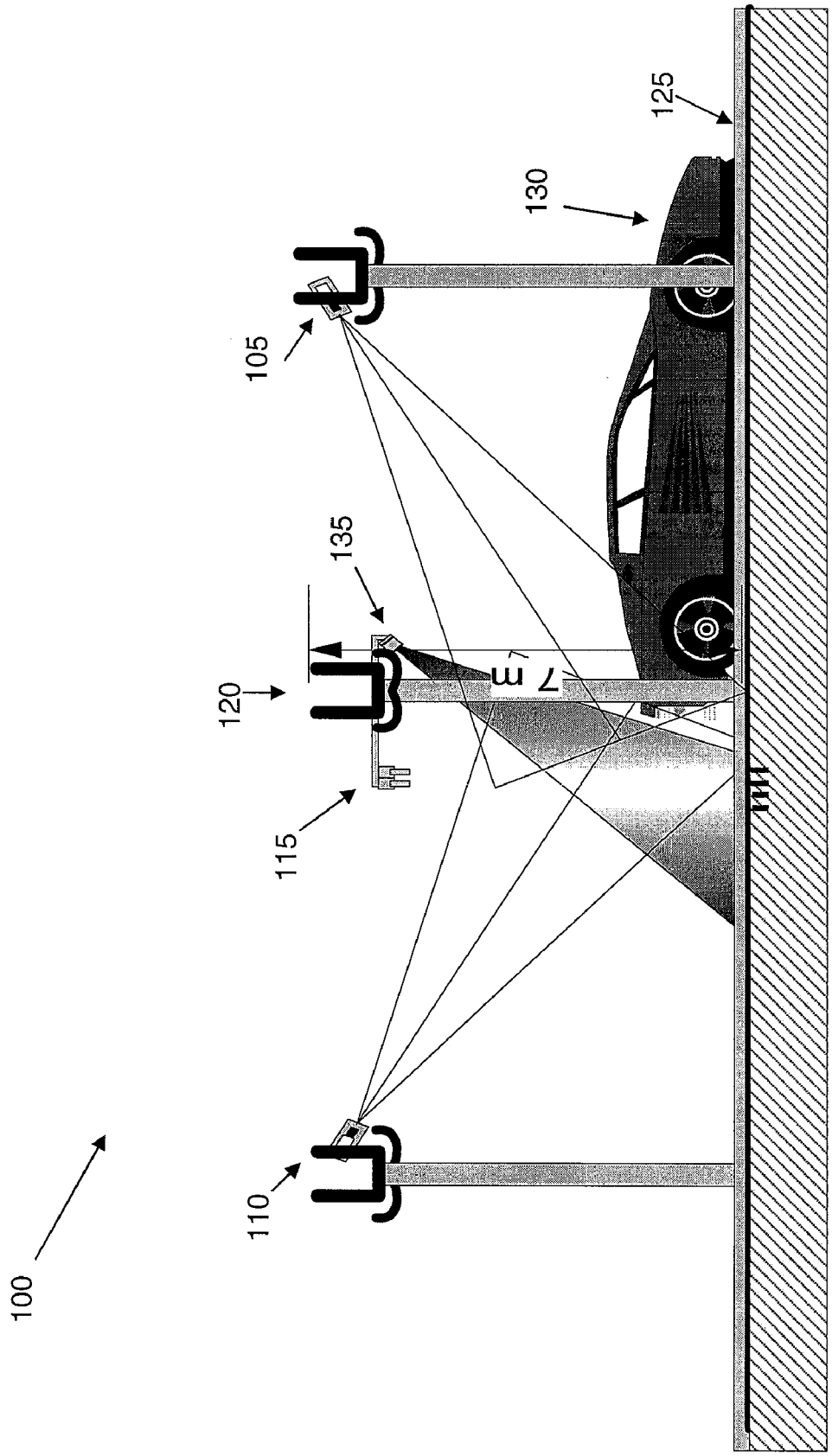
FIG. 2 is a block diagram detailing a vehicle driving through a charging point area in which an image is taken of the vehicle's rear license plate, in accordance with embodiments of the present invention.

FIG. 2 illustrates the same charging point area 100 as in FIG. 1, in accordance with embodiments of the present invention. In this example, the vehicle 130 is continuing through the charging point area 100, until such a time that the laser 115 triggers the second camera 110 to take a photograph of the vehicle's rear license plate. Again, the same light 135 illuminates in a downwardly direction towards the road 125, illuminating an aspect of the vehicle 130 as the vehicle 130 continues to drive through the charging point area 100. The photograph of the rear license plate is stored in a data store along with information such as the date, the time and an identifier identifying the location of the charging point area 100. Optionally, vehicles 130 may be operable for cooperating with an onboard charging unit (not shown) which identifies vehicles 130 as they pass through the charging point area 100. An antenna 120 connected to one or more transmitters (not shown) detects when a vehicle 130 is passing through the charging point area 100.

Figure 3:
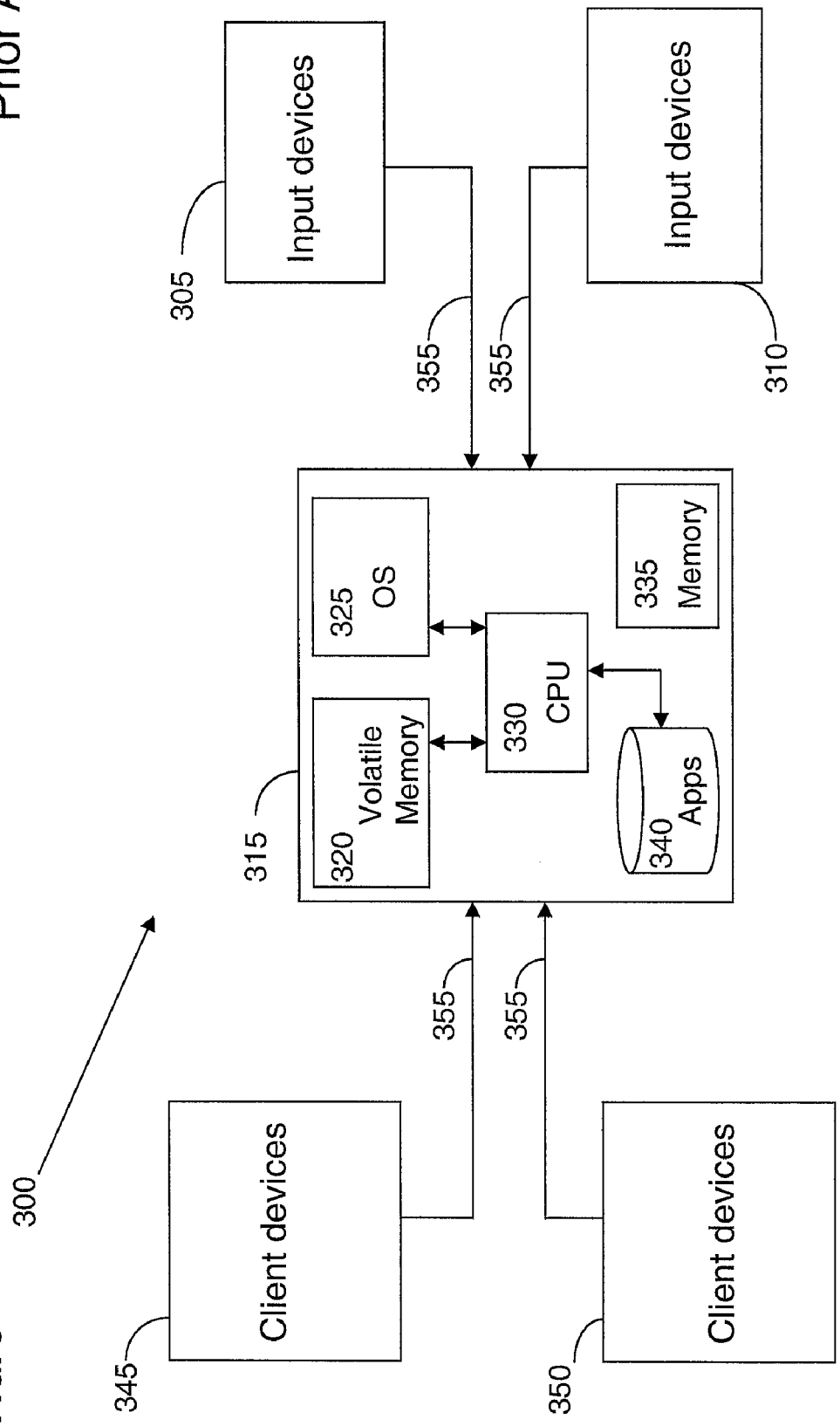
FIG. 3 is a block diagram detailing a data processing system in which embodiments of the present invention may be implemented.

Each charging point area 100 interfaces with a distributed data processing system. One such data processing system is shown in FIG. 3, in accordance with embodiments of the present invention. The data processing system 300 comprises a number of input devices 305, 310 (for example, a camera 305 or an on-board computing device configurable for operating in a vehicle 130). The input devices 305, 310 transmit data for receiving by a computing device 315 (for example, a server). The computing device 315 comprises an operating system (OS) 325, a CPU 330, volatile memory 320, and non-volatile memory 335 on which applications are stored and executed. The data received from the input devices 305, 310 is stored in a data store 340 until such a time as applications request access to the data store 340 for processing the data. The data store may be located locally on the computing device 315 or accessed across a network 355 for example, accessed via network attached storage or a storage area network.

Client devices 345, 350 are configurable for interfacing with the computing device 315 in order to provide data input means. For example, a client device 345, 350 may manage software which triggers image capture software via a camera attached to the computing device 315.

In order to process the images taken by a camera 105, 110 or other image capture device, the data in the image is translated into some meaningful form. For example, in a road charging environment, the vehicle registration number may be captured from the image of the vehicles front or rear license plate in order for the registered owner of the vehicle to be identified and billed. Or in a security system where cameras take images of employees or members of the public, it may be necessary for the employee number or other means of identification to be identified and cross referenced against a database of employee data for detecting any anomalies.

In one embodiment, an optical character recognition (OCR) engine is deployed. In one embodiment more than one OCR engine is deployed. OCR engines translate images of characters into a standard encoding scheme representing the translated characters in ASCII or Unicode. In one embodiment, several OCR engines are deployed to extract the registration numbers of vehicles 130 taken from images captured from a vehicle's license plate.

Figure 4:
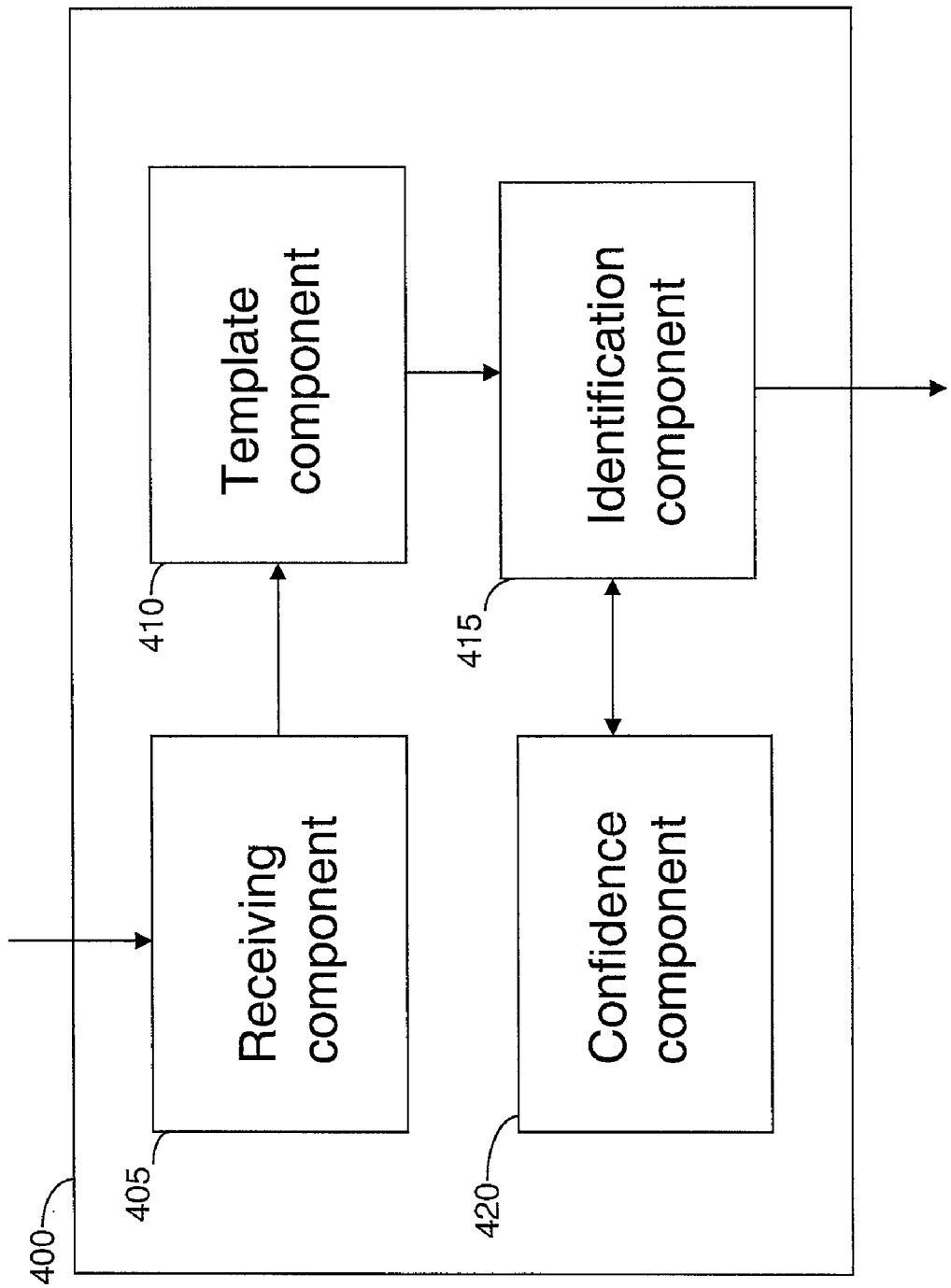
FIG. 4 is a block diagram detailing an OCR engine and its sub component, in accordance with embodiments of the present invention.

An OCR engine is shown in FIG. 4, in accordance with embodiments of the present invention. The OCR engine 400 comprises a receiving component 405 for receiving data packets comprising images representative of the front license plate and the rear license plate of vehicles, a template component 410 for describing the syntax of, for example, a license number of a license plate (e.g., HT55 HNZ), an identification component 415 for identifying characters within the image which make up a vehicle's vehicle registration number in accordance with the syntax detailed within the template, and a confidence level component 420 for deriving a confidence level based on the ease with which the identification component 415 identifies a character within the captured image of the vehicle's vehicle registration number.

The template component 410 details the syntax of the data to be identified (e.g., the correct syntax of a vehicle registration number an employee serial number, or any other data which may be captured from an image). Using the example of vehicle registration number, in Sweden the syntax for a vehicle registration number is three letters followed by three digits, in Norway and Denmark the syntax is two letters and five digits, and in the United Kingdom, the syntax is two letters, followed by two digits, followed by three letters, etc.

The identification component 415 parses each image and tries to identify each of the characters of the vehicle's vehicle registration number and whether the extracted characters conform to the required syntax. The identification component 415 deploys a matching algorithm in order to carry out the identification and to determine a confidence level in which each character is identified. For example, taking the vehicle registration number HT55 HNX, the matching algorithm tries to confidently identify that the character H in the image is the letter H, the character T is the letter T, the character 5 is the numerical digit 5, the next character 5 is the numerical digit 5, and the characters H, N and X are the letters H, N, and X and so on.

The identification component 415 interfaces with the confidence component 420 in order to rate the confidence level in which the identification component 415 identified each of the characters in the image. In the above example of HT55 HNZ, the confidence component 420 may rate the match identified by the identification component 415 as having a high confidence value, because the identification component 415 easily identified each of the characters and the resulting characters conformed to the relevant syntax.

If the matching algorithm, cannot match a character, or can only partially match a character (e.g., taking the character 'L', if the image taken was obscured because of dirt on the license plate or snow etc, the character 'l' may actually look like the character 'I'), the confidence level of the match by the matching algorithm would be low. The above process is carried out for each image sent to the OCR engine 400.

However, even with the technological advances in matching algorithms for OCR engines 400, it has been shown that even when the determined confidence level is high, inaccuracies still exist.

Figure 5:
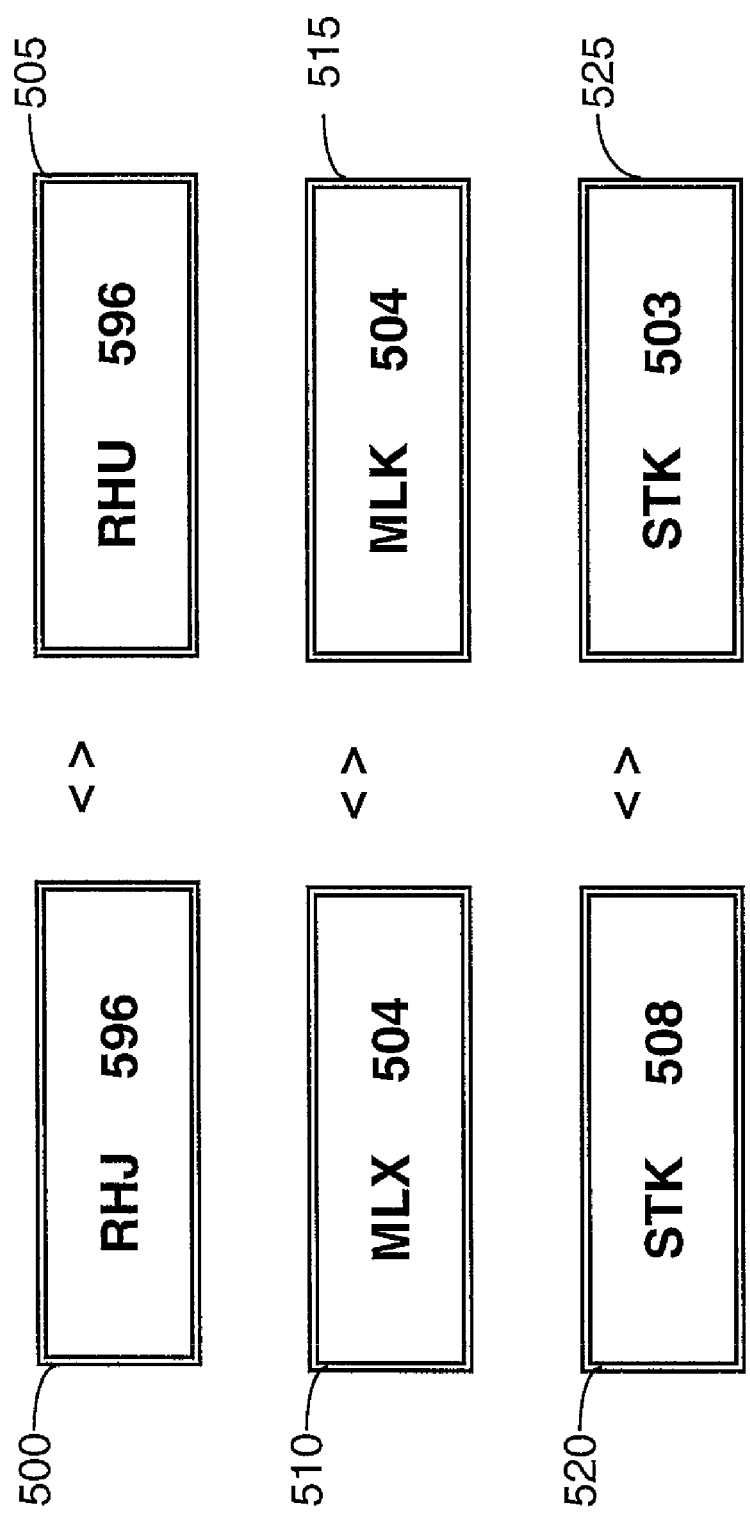
FIG. 5 is a block diagram showing vehicle registration numbers and the same vehicle registration numbers as identified by an OCR engine, in accordance with embodiments of the present invention.

For example, in FIG. 5, a number of vehicle registration numbers are shown, in accordance with embodiments of the present invention. The registration numbers 500, 510, 520 are the characters captured in an image. The registration numbers 505, 515, 525 are the character strings derived from application of the matching algorithm to the registration numbers 500, 510, 520. As is shown, the matches are far from accurate and thus the identifications and confidence levels can not always be relied upon.

In accordance with embodiments of the present invention, a validation engine is provided, in which the validation engine validates conforming and contradictory confidence levels from OCR engines. The validation engine is configurable for interfacing with one or more OCR engines and receives inputs from one or more OCR engines for processing. The validation component improves and adds to OCR algorithms in order to improve the accuracy and trust worthiness of the OCR engine's output data.

Figure 6:
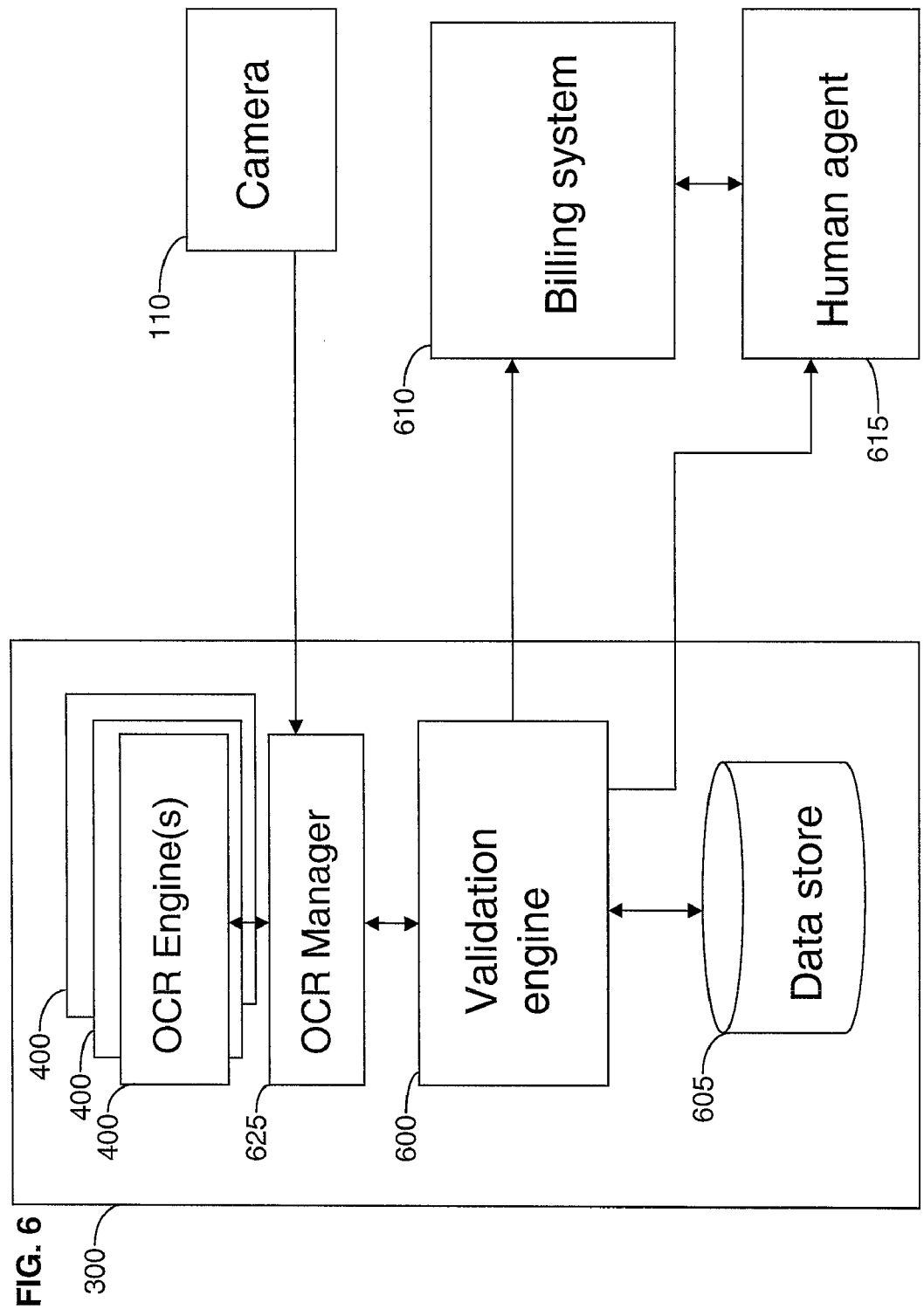
FIG. 6 is a block diagram showing a validation engine, in accordance with embodiments of the present invention.

FIG. 6 shows an arrangement of an OCR engine 400 and the validation engine 600 operable with the data processing system 300 of FIG. 3, in accordance with embodiments of the present invention. The OCR engine 400 receives images from an input device such as, inter alia, a camera. The OCR engine 400 processes the images as described supra with reference to FIG. 4. The OCR engine 400 creates a work package which is transmitted to the validation engine 600 for determining whether the results of the OCR engine 400, which can be contradictory or conflicting, can be verified. Alternatively, an OCR engine manager 625 is deployed for receiving work packages from multiple OCR engines 400 as shown, for transmitting to the validation engine 600.

The validation engine 600 receives work packages via a workflow queue from multiple OCR engines 400. Each work package comprises a set of images, the character strings formed from the matching algorithms, and a derived confidence level for each of the character strings. The derived confidence level for each character string has been derived from the confidence levels of the individual characters in each character string by any method known to a person of ordinary skill in the art.

Thus, the validation engine 600 receives, from at least two optical character recognition (OCR) engines 400, at least two identification sets such that each identification set comprises a character string consisting of a plurality of characters and a confidence level associated with the character string. Each character string has been derived by the respective OCR engine 400 from an image of the entity (e.g., license plate attached to the front or rear of the vehicle), wherein at least one identification set of the at least two identification sets is received by the validation engine from each OCR engine 400.

The validation engine 600 stores the results computed by the validation engine 600, said results comprising whether the license plates or other entity has been identified by the validation engine, in a data store 605 of the data processing system 300. If the validation engine 600 can verify the results of the OCR engine 400 and the results do not fall into certain exception criterion, the validation engine 600 may transmit a message to a billing system 610 to bill the registered owner of the vehicle. If the validation engine 600 cannot verify the results of the OCR engine 400, the validation engine 600 may communicate a notification to an operator 615 requesting the re-examining of the results of the OCR engine 400 and the validation engine 600.

Figure 7:
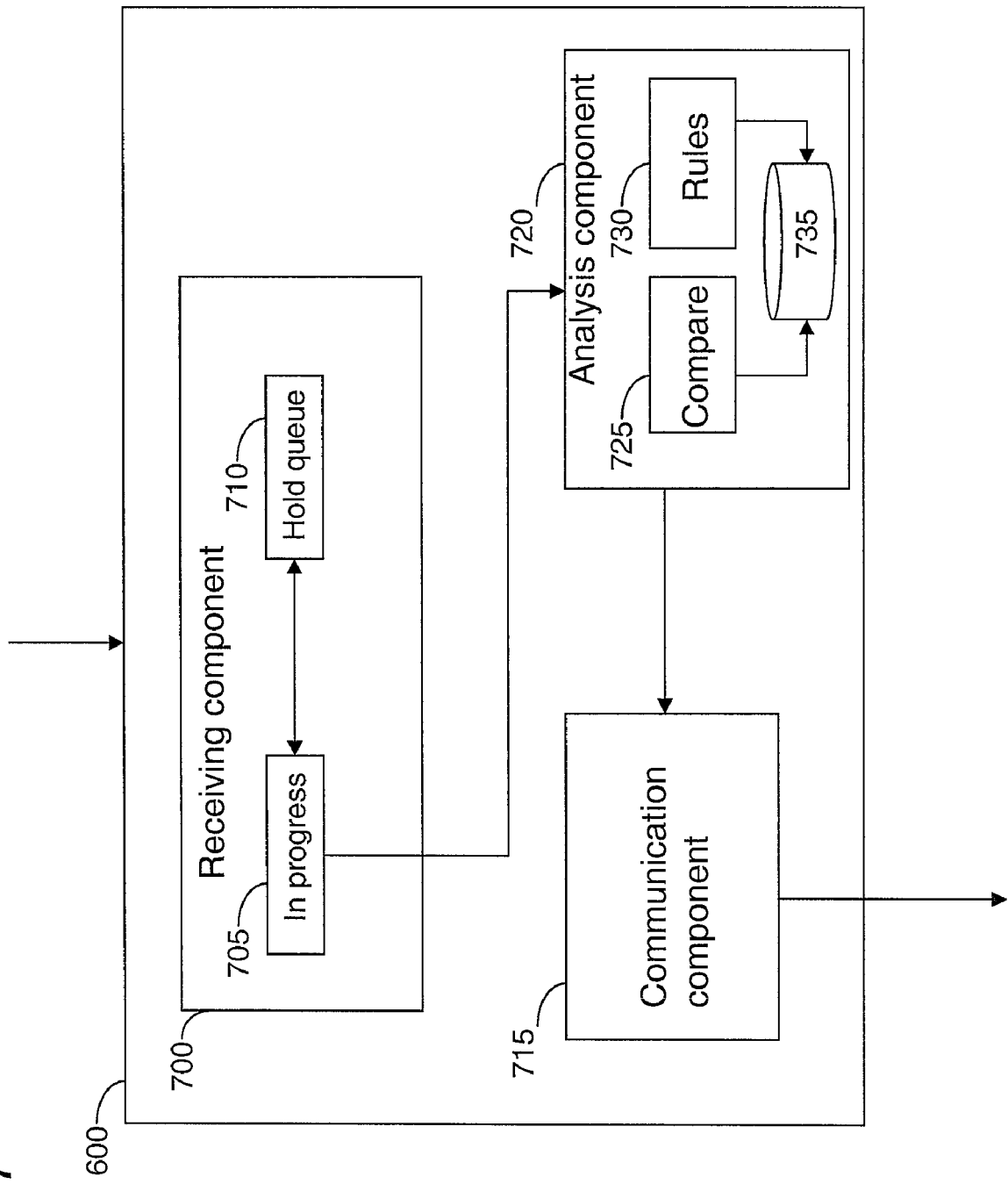
FIG. 7 is a block diagram showing the components of the validation engine, in accordance with embodiments of the present invention.

The validation engine 600 comprises a number of components which interface and interact with each other in order to verify and validate the findings of the OCR engine 400. These components are shown in FIG. 7, in accordance with embodiments of the present invention. The components comprise a receiving component 700, an analysis engine 720, and a communication component 715. The receiving component 700 receives work packages from the workflow queue and an extracting image, character strings, and confidence rating from the work package. The analysis engine 720 determines from the confidence level and the OCR identifications a validation response from conflicting confidence level. The receiving component 700 further comprises an in-progress queue 705, and a holding queue 710 for managing a stream of work packages from the OCR engines 400 to the validation engine 600.

The receiving component 700 receives work packages from the workflow queue. The receiving component 700 examines each of the workflow packages and determines if each of the workflow packages comprises at least two images and two confidence level ratings. If the determination is positive, the receiving 700 component places the work package into an in-progress queue 705. If the determination is negative, the receiving component 700 places the work package onto a holding queue 710 and does not continue processing the work package until further work packages have been detected. The work package will stay on the holding queue 710 for a predetermined amount of time. If after the predetermined amount of time, a further work package is not received and only one image is contained within the work package, the work package is rejected.

The receiving component 700 monitors the in-progress queue 705 and when a work package is placed on the queue, the receiving component 700 transmits the work package to the analysis component 720 for processing.

The analysis component 720 receives one or more work packages from the receiving component 700. The analysis component 720 begins by decoding the work packages into a number of different properties (e.g., charging point name, date and time, the number of images received, and the confidence levels derived by each of the OCR engines). The analysis component 720 writes the extracted properties to a log file.

The analysis component 720 parses the log file and compares, via the compare component 725, the results of each of the outputs from each of the OCR engines 400. The analysis component 720 uses a rules engine 730 for determining whether any two identifications are identical. For example, if the aggregated set (i.e., the log file) comprises four images wherein each image has a derived registration number and a confidence level, the analysis component 720 begins by comparing the first derived registration number with a second derived registration number, and if no identical match is detected, the analysis component 720, via a comparison component 725, compares the first derived registration number with the third and so on until all combinations of derived registration numbers have been compared. Table 1 depicts the comparisons between registration numbers.

TABLE 1

| Reg. No. | 1 | 2 | 3 | 4 |
| --- | --- | --- | --- | --- |
| 1 |  | Compare | Compare | Compare |
| 2 | Compare |  | Compare | Compare |
| 3 | Compare | Compare |  | Compare |
| 4 | Compare | Compare | Compare |  |

Each of the comparison results is written to a data file in a data store 735. The analysis component 720, via a rules/logic component 730, analyses each of the comparison results in the data store 735 to determine a validation response to, for example, a billing system.

The analysis component 720 determines from the log file if there are at least two identical identifications with a confidence level rating over a predefined threshold confidence level of, for example, eight five percent. If the determination is positive a response is sent, for example, to the billing system 610 via the communication component 715, instructing the billing system 610 to bill the registered owner of this vehicle. However, if no OCR engine identifications with a confidence level over a predefined threshold confidence level of, for example, eight five percent exist, then the work package comprising the images, the identifications, the log file and confidence level are sent to human agent(s) 615 (see FIG. 6) for identification and validation before arriving at a final decision of whether to bill the registered owner of the vehicle.

However, if at least two identifications are identical and there are no further conflicting identifications having confidence levels above a predefined threshold confidence level of, for example, eighty five percent, then the analysis component 720 verifies that the identification is a correct identification.

If conflicting identifications are detected having a confidence level over a predefined threshold confidence level of, for example, seventy percent, except for a special case (e.g., the identification of a charge exempt vehicle), the work package is sent to one or more human agents 615. For example, if identification ABC 123 exceeds eighty five percent confidence level and identification BBC 123 exceeds seventy percent confidence level, then the work package is sent to human agents for verification.

If the analysis component 720 detects identifications having a confidence level, for example, between a predefined threshold confidence level of, for example, seventy percent and a predefined maximum confidence level of, for example, eighty five percent, but at least three OCR identifications are identical and the identical identifications are from the front and the rear license plates, then the analysis component accepts the identification. For example, if front identification ABC123 exceeds eight five percent confidence level, rear identification ABC123 exceeds eighty five percent confidence level, front identification ABC123 exceeds eight five percent confidence level, and rear BBC123 exceeds seventy percent confidence level, then the identification is accepted.

If the analysis component 720 detects identifications each having a high confidence level of, for example, exceeding eighty five percent, but at least some of the identifications are conflicting, then the analysis component marks the work package as having conflicting identifications and transmits the work package to human agents 615 for verification. For example, if front identification ABC123 exceeds eight five percent confidence level, front identification ABC123 exceeds eight five percent confidence level, rear identification ABC123 exceeds eight five percent confidence level, rear identification BCD123 exceeds eighty five percent confidence level, rear identification BCD123 exceeds eight five percent confidence level, and rear identification BCD123 exceeds eighty five percent confidence level, then conflicting identifications are indicated and the work package is sent to human agents 615.

If the analysis component 720 identifies only one OCR engine 400 identification, for example with a confidence level greater than a predefined threshold confidence level of, for example, eighty five percent, then the analysis component 720 transmits the work package to the communication component 715 for transmitting to a manual agent 615 for identification.

If the analysis component 720 identifies any of the identifications being greater than eight five percent and the vehicle is identified as being, for example, a taxi, or other vehicle excluded from charging, then a lookup in a registration database is performed to confirm that the vehicle is indeed a taxi and the work package in discarded. If the identification is not found in the database, then the identification is transmitted via the communication component 715 to a human agent 615 for verification.

If the analysis component 720 identifies an identification with a confidence level over eighty five percent and another identification with a confidence level over a predefined threshold confidence level of, for example, eighty five percent and the first identification is a taxi and the second identification is a foreign vehicle, then the rules for a taxi take precedence.

If the analysis component 720 identifies a first identification with a high confidence level of, for example, exceeding eighty five percent and the vehicle is a foreign vehicle, then the work package is transmitted to human agents 615 for verification.

The above process is repeated for every work package received by the validation engine 600. However, it will be understood by a person skilled in the art that other types of rules or logic may be incorporated without departing from the scope of the present invention.

FIG. 8 is a flow chart detailing the process steps of the validation engine 600, in accordance with embodiments of the present invention. At step 800, the receiving component 700 of the validation engine 600 receives a work package from one or more OCR engines and places each work package on the in-progress queue 705. The receiving component 700 waits for a predetermined amount of time until the receiving component 700 determines that there are no further work packages to be received from any OCR engines 400 relating to the vehicle identified in the image. Once the receiving component 700 has collated each of the work packages, at step 805 the receiving component 700 extracts each of the images, the identifications, and the confidence level data generated by an OCR engine 400. At step 810, the receiving component 700 sends the extracted data to the analysis component 720 wherein the analysis component 720 determines for each pair of images whether the confidence levels generated by an OCR engine 400, confirm or contradict the confidence level generated by another OCR engine 400. At step 815, the analysis component 720 uses a number of rules in order to determine whether the identified conflicting confidence levels falls within a predetermined range of operating parameters which are determined by the rules. Depending on where in the range the identification conflict lies, at step 820 the analysis component 720 determines an appropriate action to be performed (e.g., apply further rules to resolve the conflict, generate a notification to a billing system, request a manual agent review the images, the image identifications and the confidence levels) to resolve the conflicting identifications.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for analyzing image identifications to determine whether the image identifications identify an entity, said method comprising:

receiving, by a validation engine from at least two optical character recognition (OCR) engines, at least two identification sets such that each identification set comprises a character string consisting of a plurality of characters and a confidence level associated with the character string, wherein each character string has been derived by a respective OCR engine of the at least two OCR engines from an image of the entity, wherein at least one identification set of the at least two identification sets is received by the validation engine from each OCR engine;

comparing, by the validation engine, each character string with every other character string, resulting in identifying all conflicting character strings, wherein any two non-identical character strings are considered to be conflicting;

analyzing, by the validation engine, the confidence level in each identification set, resulting in determining whether said each confidence level exceeds a predefined threshold confidence level;

applying, by the validation engine, at least one rule to the identifying resulting from said comparing and/or to the determining resulting from said analyzing, resulting in ascertaining whether or not the entity has been identified; and storing, in a data store coupled to the validation engine, an indication of whether or not said ascertaining has ascertained that the entity has been identified, wherein said storing is performed by the validation engine.

2. The method of claim 1, wherein said applying the at least one rule results in ascertaining that the entity has not been identified, and wherein the method further comprises:

after said applying the at least one rule, transmitting to a manual agent the at least two identification sets and the images from which the character strings of the at least two identification sets have been derived by the at least two OCR engines, for subsequent use by the manual agent to identify the entity.

3. The method of claim 1, wherein a plurality of identification sets of the at least two identification sets is received by the validation engine from an OCR engine of the at least two OCR engines.

4. The method of claim 1, wherein the at least two identification sets comprises at least four identification sets, wherein a first plurality of identification sets of the at least four identification sets is received by the validation engine from a first OCR engine of the at least two OCR engines, and wherein a second plurality of identification sets of the at least four identification sets is received by the validation engine from a second OCR engine of the at least two OCR engines.

5. The method of claim 1, wherein said comparing determines that at least two character strings are identical and said analyzing determines that the confidence level of each character string of the at least two identical character strings exceeds the predefined threshold confidence level, and wherein said applying the at least one rule results in ascertaining that the entity is identified from the at least two identical character strings.

6. The method of claim 5, wherein the predefined threshold confidence level is 85%.

7. The method of claim 1, wherein said analyzing determines that the confidence level of each character string does not exceed the predefined threshold confidence level, and wherein said applying the at least one rule results in ascertaining that the entity has not been identified.

8. The method of claim 1, wherein said comparing determines that at least two character strings are identical and said analyzing determines that no other character string has a confidence level exceeding the predefined threshold confidence level, and wherein said applying the at least one rule results in ascertaining that the entity is identified from the at least two identical character strings.

9. The method of claim 1, wherein said comparing determines two conflicting character strings and said analyzing determines that the confidence level of each character string of the two conflicting character strings exceeds the predefined threshold confidence level, and wherein said applying the at least one rule results in ascertaining that the entity has not been identified.

10. The method of claim 9, wherein the predefined threshold confidence level is 70%.

11. The method of claim 1, wherein said analyzing determines that the confidence level of each character string of at least two character strings exceeds the predefined threshold confidence level and said comparing determines that two character strings of the at least two character strings are non-identical, and wherein said applying the at least one rule results in ascertaining that the entity has not been identified.

12. The method of claim 1, wherein said analyzing determines that the confidence level of only one character string exceeds the predefined threshold confidence level, and wherein said applying the at least one rule results in ascertaining that the entity has not been identified.

13. The method of claim 12, wherein the predefined threshold confidence level is 85%.

14. A data processing system comprising a processor and a computer readable memory device coupled to the processor, said memory device containing software code configured to be executed by the processor to perform the method of claim 1, wherein the data processing system further comprises the at least two OCR engines, the verification engine, and the data store.

15. A computer program product, comprising a computer readable storage device having software code that when executed on a computer of a data processing system implements the method of claim 1.

16. A method for analyzing image identifications to determine whether the image identifications identify a license plate of a vehicle, said method comprising:

receiving, by a validation engine from at least one optical character recognition (OCR) engine, at least two identification sets such that each identification set comprises a character string consisting of a plurality of characters and a confidence level associated with the character string, wherein each character string has been derived by a respective OCR engine of the at least one OCR engine from an image of the license plate attached to the front or rear of the vehicle, wherein at least one identification set of the at least two identification sets is received by the validation engine from each OCR engine;

comparing, by the validation engine, each character string with every other character string, resulting in identifying all conflicting character strings, wherein any two non-identical character strings are considered to be conflicting;

analyzing, by the validation engine, the confidence level in each identification set, resulting in determining whether said each confidence level exceeds a predefined threshold confidence level and/or is within a predefined range of confidence levels;

applying, by the validation engine, at least one rule to the identifying resulting from said comparing and/or to the determining resulting from said analyzing, resulting in ascertaining whether or not the license plate has been identified; and storing, in a data store coupled to the validation engine, an indication of whether or not said ascertaining has ascertained that the license plate has been identified, wherein said storing is performed by the validation engine.

17. The method of claim 16,
wherein the at least one OCR engine consists of a single OCR engine;
wherein the character string of a first identification set of the at least two identification sets has been derived by the single OCR engine from an image of the license plate attached to the front of the vehicle, and
wherein the character string of a second identification set of the at least two identification sets has been derived by the single OCR engine from an image of the license plate attached to the rear of the vehicle.

18. The method of claim 16, wherein the at least one OCR engine consists of at least two OCR engines.

19. The method of claim 18, wherein each character string has been derived by the respective OCR engine from an image of the license plate attached to the front of the vehicle or each character string has been derived by the respective OCR engine from an image of the license plate attached to the rear of the vehicle.

20. The method of claim 18, wherein said applying the at least one rule results in ascertaining that the license plate has not been identified, and wherein the method further comprises:
after said applying the at least one rule, transmitting to a manual agent the at least two identification sets and the images from which the character strings of the at least two identification sets have been derived by the at least two OCR engines, for subsequent use by the manual agent to identify the license plate.

21. The method of claim 18, wherein a plurality of identification sets of the at least two identification sets is received by the validation engine from an OCR engine of the at least two OCR engines.

22. The method of claim 18, wherein the at least two identification sets comprises at least four identification sets, wherein a first plurality of identification sets of the at least four identification sets is received by the validation engine from a first OCR engine of the at least two OCR engines, and wherein a second plurality of identification sets of the at least four identification sets is received by the validation engine from a second OCR engine of the at least two OCR engines.

23. The method of claim 18, wherein said comparing determines that at least two character strings are identical and said analyzing determines that the confidence level of each character string of the at least two identical character strings exceeds the predefined threshold confidence level, and wherein said applying the at least one rule results in ascertaining that the license plate is identified from the at least two identical character strings.

24. The method of claim 18, wherein said analyzing determines that the confidence level of each character string does not exceed the predefined threshold confidence level, and wherein said applying the at least one rule results in ascertaining that the license plate has not been identified.

25. The method of claim 18, wherein said comparing determines that at least two character strings are identical and said analyzing determines that no other character string has a confidence level exceeding the predefined threshold confidence level, and wherein said applying the at least one rule results in ascertaining that the license plate is identified from the at least two identical character strings.

26. The method of claim 25, wherein the predefined threshold confidence level is 70%.

27. The method of claim 18, wherein said comparing determines two conflicting character strings and said analyzing determines that the confidence level of each character string of the two conflicting character strings exceeds the predefined threshold confidence level, and wherein said applying the at least one rule results in ascertaining that the license plate has not been identified.

28. The method of claim 27, wherein the predefined threshold confidence level is 70%.

29. The method of claim 18, wherein said analyzing determines that the confidence level of each character string of at least two character strings exceeds the predefined threshold confidence level and said comparing determines that two character strings of the at least two character strings are non-identical, and wherein said applying the at least one rule results in ascertaining that the license plate has not been identified.

30. The method of claim 18, wherein said analyzing determines that the confidence level of only one character string exceeds the predefined threshold confidence level, and wherein said applying the at least one rule results in ascertaining that the license plate has not been identified.

31. The method of claim 18, wherein the at least two identification sets comprises three identification sets, wherein said analyzing determines that the confidence level of each character string of the three identification sets exceeds the predefined threshold confidence level and does not exceed a predefined maximum confidence level and said comparing determines that the character strings of the three identification sets are identical and the character strings of the three identification sets have been derived by the respective OCR engine from images of the license plate attached to both the front and rear of the vehicle, and wherein said applying the at least one rule results in ascertaining that the license plate is identified from the identical character strings of the three identification sets.

32. The method of claim 18, wherein the predefined threshold confidence level is 70%, and wherein the predefined maximum confidence level is 85%.

33. The method of claim 18, wherein said analyzing determines that the confidence level of one character string exceeds the predefined threshold confidence level and the one character string identifies the vehicle as a foreign vehicle, and wherein said applying the at least one rule results in ascertaining that the license plate has not been identified.

34. A data processing system comprising a processor and a computer readable memory device coupled to the processor, said memory device containing software code configured to be executed by the processor to perform the method of claim 16, wherein the data processing system further comprises the at least two OCR engines, the verification engine, and the data store.

35. A computer program product, comprising a computer readable storage device having software code that when executed on a computer of a data processing system implements the method of claim 16.

* * * * *